United States Patent
Bogenberger et al.

(10) Patent No.: US 11,218,238 B2
(45) Date of Patent: Jan. 4, 2022

(54) METHOD, COMPUTER-READABLE MEDIUM, SYSTEM, AND VEHICLE COMPRISING THE SYSTEM FOR VALIDATING A TIME FUNCTION OF A MASTER AND THE CLIENTS IN A NETWORK OF A VEHICLE

(71) Applicant: Bayerische Motoren Werke Aktiengesellschaft, Munich (DE)

(72) Inventors: Florian Bogenberger, Poing (DE);
Emily Hudoletnjak, Munich (DE);
Alexander Maier, Langenbach (DE);
Max Turner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 239 days.

(21) Appl. No.: 16/533,991

(22) Filed: Aug. 7, 2019

(65) Prior Publication Data

US 2019/0363815 A1 Nov. 28, 2019

Related U.S. Application Data

(63) Continuation of application No. PCT/EP2018/065159, filed on Jun. 8, 2018.

(30) Foreign Application Priority Data

Jun. 28, 2017 (DE) .................... 10 2017 210 895.9

(51) Int. Cl.
*H04J 3/06* (2006.01)
*G06F 1/12* (2006.01)
(Continued)

(52) U.S. Cl.
CPC .............. *H04J 3/0667* (2013.01); *G06F 1/12* (2013.01); *G06F 1/14* (2013.01); *H04J 3/0641* (2013.01); *H04L 45/02* (2013.01); *H04L 45/121* (2013.01)

(58) Field of Classification Search
CPC ...... H04J 3/0667; H04J 3/0641; H04J 3/0664; G06F 1/12; G06F 1/14; H04L 45/02;
(Continued)

(56) References Cited

U.S. PATENT DOCUMENTS

2009/0184871 A1 7/2009 Tofighbakhsh
2010/0019811 A1 1/2010 Malekpour
(Continued)

FOREIGN PATENT DOCUMENTS

DE 10 2011 087 472 A1 6/2013
EP 3 288 200 A1 2/2018

OTHER PUBLICATIONS

International Search Report (PCT/ISA/210) issued in PCT Application No. PCT/EP2018/065159 dated Aug. 30, 2018 with English translation (six (6) pages).
(Continued)

*Primary Examiner* — Justin T Van Roie
(74) *Attorney, Agent, or Firm* — Crowell & Moring LLP

(57) ABSTRACT

A method for validating a time function in a network of a vehicle includes: ascertaining a receiving time of a sync message of a master; receiving a follow-up message of the master; ascertaining a receiving time of a further sync message of the master; receiving a further follow-up message of the master; determining a time function of the first client based on the receiving time of the sync message, the receiving time of the further sync message, the transmission time of the follow-up message, and the transmission time of the further follow-up message; ascertaining a synchronized
(Continued)

transmission time of a path delay request message from the first client to the master; ascertaining a synchronized receiving time of a path delay response message from the master; receiving a path delay response follow-up message from the master by the first client; and validating a time function of the master.

13 Claims, 4 Drawing Sheets

(51) Int. Cl.
    *G06F 1/14*           (2006.01)
    *H04L 12/751*       (2013.01)
    *H04L 12/727*       (2013.01)

(58) Field of Classification Search
    CPC ............. H04L 45/121; H04L 2463/121; H04L 63/123; H04L 2012/40273; H04L 43/0858; H04L 43/0864; H04W 4/48
    See application file for complete search history.

(56) References Cited

U.S. PATENT DOCUMENTS

| | | | | |
|---|---|---|---|---|
| 2010/0150117 A1* | 6/2010 | Aweya | ...................... | G01S 5/14 370/338 |
| 2013/0272322 A1* | 10/2013 | Sagarwala | ............ | H04J 3/0658 370/508 |
| 2014/0122755 A1* | 5/2014 | Chandra | ............. | G06F 13/4295 710/106 |
| 2015/0134764 A1 | 5/2015 | Noebauer et al. | | |

OTHER PUBLICATIONS

German-language Written Opinion (PCT/ISA/237) issued in PCT Application No. PCT/EP2018/065159 dated Aug. 30, 2018 (10 pages).

German-language Search Report issued in counterpart German Application No. 10 2017 210 895.9 dated May 9, 2018 with partial English translation (14 pages).

Wunner et al., "Development and Testing Automotive Ethernet-Networks Together in One Tool-OMNET++", Sep. 3, 2014, https://arxiv.org/pdf/1409.1026.pdf, XP055499947 (six (6) pages).

Noseworthy et al., "Network-Based Application-Independent Time-Error and Direct Port Latency Measurement", IEEE , 2016, Durham, New Hampshire, XP 32971423 (six (6) pages).

Noseworthy et al., "Passive and Active Probing of Slave Timing Error for 802.1 AS", IEEE 802.1 Time Sensitive Networking TG, Nov. 11, 2015, pp. 1-28, XP 68101371 (28 pages).

\* cited by examiner

METHOD, COMPUTER-READABLE MEDIUM, SYSTEM, AND VEHICLE COMPRISING THE SYSTEM FOR VALIDATING A TIME FUNCTION OF A MASTER AND THE CLIENTS IN A NETWORK OF A VEHICLE

CROSS REFERENCE TO RELATED APPLICATIONS

This application is a continuation of PCT International Application No. PCT/EP2018/065159, filed Jun. 8, 2018, which claims priority under 35 U.S.C. § 119 from German Patent Application No. 10 2017 210 895.9, filed Jun. 28, 2017, the entire disclosures of which are herein expressly incorporated by reference.

BACKGROUND AND SUMMARY OF THE INVENTION

The invention relates to a method for validating a time function of a master and of the clients in a network of a vehicle. The invention furthermore relates to a computer-readable medium, to a system, and to a vehicle comprising the system for validating a time function of a master and of the clients in a network of the vehicle.

The prior art discloses various standardized methods for time synchronization in networks. By way of example, the Precision Time Protocol (PTP) describes a time synchronization method that is standardized, for example, in IEEE 1588 and IEEE802.1AS. PTP makes provision to transmit time synchronization messages in one direction from a transmitter to a receiver. The transmitter does not have any information as to whether the time synchronization messages have been correctly received and processed at a receiver. Correct operation of an overall system within the meaning of functional safety in accordance with ISO 26262 is therefore not able to be achieved by way of the known time synchronization methods.

One object of the invention is therefore to improve validation of a time function in a network of a vehicle in an efficient manner.

This object is achieved by the features of the independent claims. Advantageous refinements and developments of the invention emerge from the dependent claims.

According to a first aspect, the invention is distinguished by a method for validating a time function in a network of a vehicle. The network may be CAN, FlexRay and/or Ethernet. The time function may comprise time mapping, which converts a measured time into a synchronized time or maps a measured time onto a synchronized time. The vehicle may be a land vehicle, for example a motor vehicle or a motorcycle. The method comprises determination of a reception time of a synchronization message of a master for synchronization of an item of time information by a first client, wherein the first client, hereinafter also called validator, is connected to the master via a first communication channel. The master may be a device or a component of the network to which the first client is connected via the first communication channel. The master may be a grandmaster, that is to say a master that corresponds to a root element in a hierarchy of masters, or a sub-master, that is to say a master that is arranged below the root element in the hierarchy of masters. By way of example, a bridge of the network may be a sub-master. The first communication channel may for example provide the Precision Time Protocol (PTP). The synchronization message is preferably a message that is transmitted periodically and/or in an event-controlled manner from a master to a client, for example, the first client. The method furthermore comprises reception of a follow-up message of the master via the first communication channel by the first client, wherein the follow-up message comprises a transmission time of the synchronization message to the master. The follow-up message is preferably a message that follows a synchronization message of the master and is transmitted from the master to the first client. As an alternative, the synchronization message and the follow-up message may be combined into a shared message in a method having just one step.

The method comprises determination of a reception time of a further synchronization message of the master by the first client, and reception of a further follow-up message of the master via the first communication channel by the first client, wherein the further follow-up message comprises a transmission time of the further synchronization message. The method determines a time function of the first client on the basis of the reception time of the synchronization message, the reception time of the further synchronization message, the transmission time of the synchronization message included in the follow-up message and the transmission time of the further synchronization message included in the follow-up message. The time function of the first client may map a measured time of the first client onto a synchronized time. In general, a time function of a device of the network is able to map a time measured on the device onto a synchronized time of the network. A time may be, for example, a transmission time or a reception time of a message.

The method furthermore comprises determination of a synchronized transmission time of a path delay request message from the first client to the master by way of the time function of the client, determination of a synchronized reception time of a path delay response message from the master by way of the time function of the client, and reception of a path delay response follow-up message from the master by the first client, wherein the path delay response follow-up message comprises a synchronized reception time of the path delay request message and a synchronized transmission time of the path delay response message. The method furthermore comprises validation of a time function of the master on the basis of the synchronized transmission time of the path delay request message to the master, of the synchronized reception time of the path delay response message to the first client, of the synchronized reception time of the path delay request message to the master, of the synchronized transmission time of the path delay response message to the first client, and of a predefined maximum delay between the first client and the master. The predefined maximum delay may comprise a delay in the communication of the messages via the first communication channel between the master and the first client and between the first client and the master.

By validating the synchronized transmission and reception times of the first client and of the master, the first client is advantageously able to assess whether the time function of the master is valid, that is to say whether the transmission and reception times determined by the client are the same as the transmission and reception times transmitted from the master to the first client or are situated at least within a predefined time interval. By using a maximum delay as an upper limit, it is able to be ensured that the synchronized transmission and reception times of the master are able to be validated by the client.

According to one advantageous refinement, the method may furthermore comprise reception of a validation request message of a second client, hereinafter also called client, via a second communication channel by the first client. The second communication channel is preferably a communication channel that uses a different communication protocol in comparison with the first communication channel. By way of example, the second communication channel may use an SOME/IP communication protocol. The validation request message may comprise the following time information between the second client and a master associated with the second client: a synchronized transmission time of a path delay request message, a synchronized reception time of a path delay response message, a synchronized reception time of a path delay request message, and a synchronized transmission time of a path delay response message. The method may furthermore comprise determination of a maximum delay between the second client and the master associated with the second client on the basis of a predefined network topology by the first client, and validation of a time function of the master associated with the second client on the basis of the synchronized transmission time of the path delay request message, of the synchronized reception time of the path delay response message, of the synchronized reception time of the path delay request message, of the synchronized transmission time of the path delay response message, and of the determined maximum delay. By way of this, a preferably central client, for example the first client, is able to validate the time function of another client, for example of the second client, on request. A client of the network is thus always able to check whether the time function of the client itself and/or of the associated master is valid. Furthermore, by virtue of the validation, a position of the client and of the master in the network is able to be determined using the network topology, and the maximum delay is able to be derived on the basis of the position of the client and of the master.

According to a further advantageous refinement, the method may further include transmission of a result of the validation of the time function of the master and/or of the master associated with the second client to one or more safety-relevant functions by the first client and/or execution of the one or more safety-relevant functions using the result of the validation of the time function. By way of this, it is possible to execute a safety-relevant function upon valid time information. If, for example, the safety-relevant function is a function for fusing sensor data, the safety-relevant function may thereby ensure that the time information of the sensor data is valid.

According to a further advantageous refinement, the method may further include prediction of a synchronized reception time of a synchronization message of the master by the first client using the time function of the first client, and validation of the time function of the first client. The validation of the time function of the first client may determine whether the predicted synchronized reception time of the synchronization message plus the predefined maximum delay between the first client and the master gives a value that lies within a predefined interval range around the transmission time, contained in the follow-up message, of the master. If the value lies within the predefined interval range, the method is able to determine the time function of the first client as valid. If the value does not lie within the predefined interval range, the method is able to determine the time function of the first client as not valid, and update the time function of the first client on the basis of the reception time of the synchronization message, the reception time of the further synchronization message, the transmission time of the synchronization message included in the follow-up message and of the transmission time of the further synchronization message included in the follow-up message. By way of this, the first client, that is to say the validator, is able to validate its own time function in an efficient manner, and possibly update it.

According to a further advantageous refinement, the method may receive a further validation request message of the second client via the second communication channel. The further validation request message between the second client and a master associated with the second client comprises the following time information: a predicted reception time of a synchronization message between the second client and the master associated with the second client and a synchronized transmission time of the synchronization message between the second client and the master associated with the second client. The second client preferably determines the synchronized transmission time of the synchronization message from a follow-up message of the master associated with the second client. The method is able to validate the time function of the second client by way of the first client, wherein the validation of the time function of the second client determines whether the predicted reception time of the synchronization message of the second client plus a predefined maximum delay between the second client and the associated master gives a value that lies within a predefined interval range around the synchronized transmission time of the synchronization message of the master associated with the second client. If the value lies within the predefined interval range, the method is able to determine the time function of the second client as valid. If the value does not lie within the predefined interval range, the method is able to determine the time function of the second client as not valid and transmit a result of the validation of the time function of the second client to one or more safety-relevant functions by way of the first client. By way of this, the first client, that is to say the validator, is able to validate the time function of any other client of the network, for example, the second client, in an efficient manner and forward the result to safety-relevant functions of the vehicle, for example, sensor data fusion components and/or methods.

According to a further advantageous refinement, the validation of the synchronized times may determine whether the synchronized transmission time of the path delay request message plus the predefined maximum delay gives a first value that lies within a predefined interval range around the synchronized reception time of the path delay request message, and determine whether the synchronized transmission time of the path delay response message plus the predefined maximum delay gives a second value that lies within the predefined interval range around the synchronized reception time of the path delay response message. If the first value and the second value lie within the respective interval ranges, the time function of the master is able to be determined as valid. If the first value and/or the second value do not lie within the respective interval ranges, the time function of the master is able to be determined as not valid. By way of this, the time function of the master is able to be validated by the client, in particular by the first client, in an efficient manner.

According to a further advantageous refinement, the network may be an Ethernet network, the second client may be a client or a preferably time-aware bridge, and/or the master may be a grandmaster or a sub-master.

According to a further aspect, the invention is distinguished by a computer-readable medium for validating a time function of a master in a network of a vehicle, wherein the computer-readable medium comprises instructions which, when they are executed on a computer or a controller, execute the above-described method.

According to a further aspect, the invention is distinguished by a system for validating a time function of a master in a network of a vehicle, wherein the system is designed to execute the above-described method.

According to a further aspect, the invention is distinguished by a vehicle comprising the above-described system for validating a time function of a master in a network of a vehicle.

Further features of the invention emerge from the claims, the figures and the description of the figures. All features and combinations of features cited above in the description and the features and combinations of features cited below in the description of the figures and/or shown individually in the figures are able to be applied not only in the respectively specified combination, but also in other combinations or else on their own.

A preferred exemplary embodiment of the invention is described below with reference to the appended drawings. Further details, preferred refinements and developments of the invention emerge therefrom.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
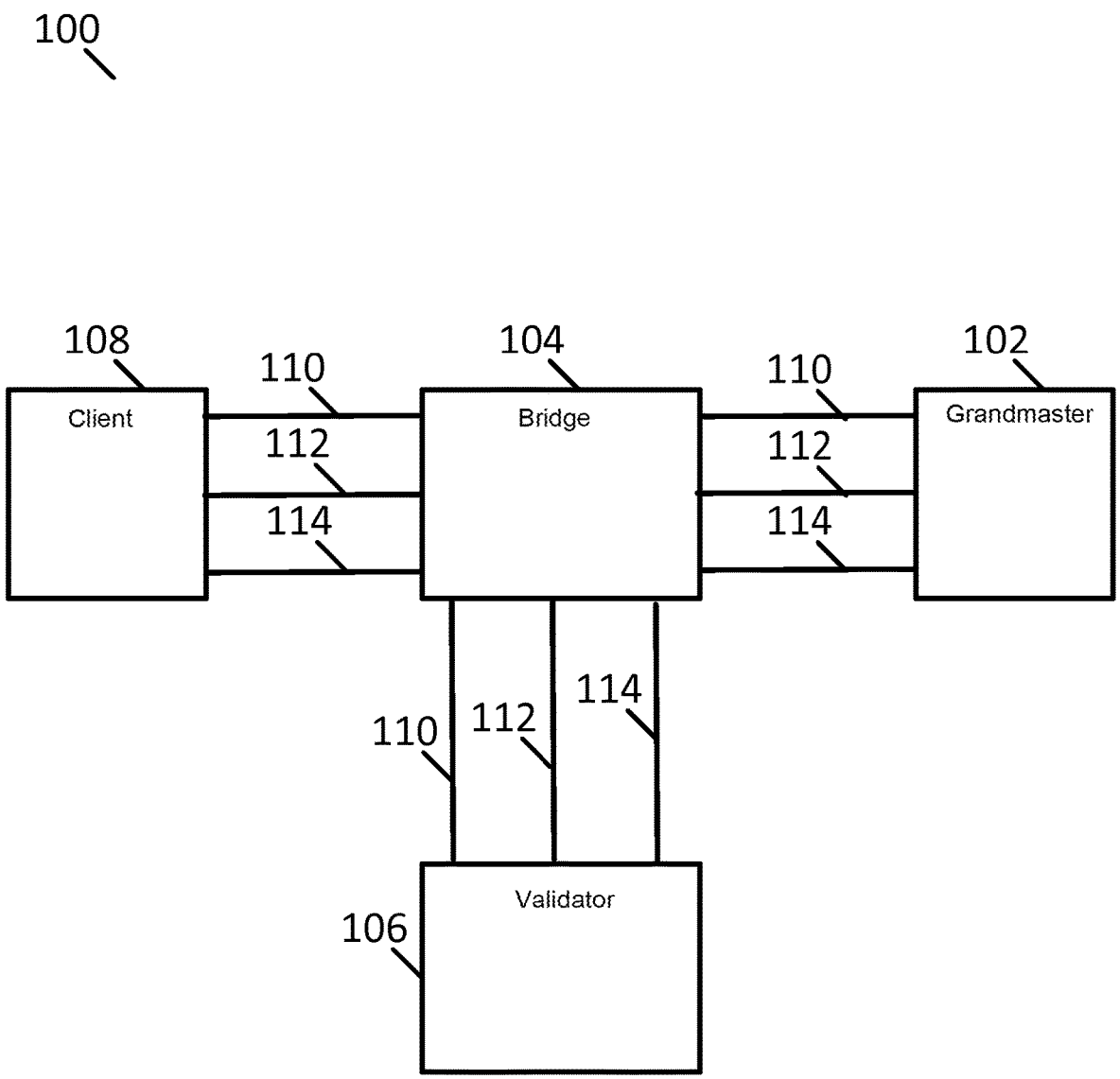
FIG. 1 schematically shows an exemplary system for validating a time function.

In detail, FIG. 1 shows a system 100 for validating a time function in a network of a vehicle. The network is preferably an Ethernet network. The exemplary system 100 shown in FIG. 1 comprises a grandmaster 102, a bridge 104, a validator 106, and a client 108. The validator 106 is a client of the bridge 104 in the system 100. Each client and each bridge may comprise a local nonsynchronous clock. The local nonsynchronous clock may determine a precise transmission time for messages that are transmitted by a client or a bridge, and a precise reception time for messages that are received by a client or a bridge. Each client and each bridge as client furthermore has a time function that executes mapping of a local nonsynchronous time T onto a synchronized time t of a respective master.

The grandmaster 102 is a network component that distributes a time to clients of the grandmaster 102. In FIG. 1, the grandmaster has a client, the bridge 104, to which the grandmaster 102 distributes the time. The time that the grandmaster 102 distributes may be indicated by t(R), wherein R denotes the time that has actually elapsed. The time R that has actually elapsed may be regarded as absolute in physical terms. However, the time R that has actually elapsed may not be measured exactly by the grandmaster 102. For this reason, the grandmaster 102 distributes the time t(R), that is to say a time dependent on the time R that has actually elapsed instead of the time R itself that has actually elapsed. The grandmaster 102 is a master or a master component of the network.

The system 100 may comprise a bridge 104, which may be a client or a sub-master. A sub-master is a master that distributes a time derived from the time of the grandmaster 102, in particular a time synchronized with the grandmaster 102, to clients of the master. By way of example, the bridge 104 is a client of the grandmaster 102. Furthermore, the bridge 104 may be, for example, a sub-master for clients of the bridge 104. As shown in FIG. 1, the bridge 104 has two clients, the validator 106 and the client 108.

The validator 106, within the meaning of ISO 26262, is able to safely validate whether a client, for example client 108, or a bridge, for example bridge 104, of the network have synchronized to the same time by way of PTP. The validator 106 is preferably a client of the bridge 104. The validator 106 has a predefined ASIL level, for example ASIL-D. The client 108, the bridge 104 and/or the grandmaster 102 therefore do not have to meet any predefined ASIL level.

As client of the bridge 104, the validator 106 is able to synchronize 110 a local nonsynchronous time T of the local nonsynchronous clock with a synchronized time t of the bridge 104 as (sub-)master. To this end, the validator 106 is able to calculate a time function t'v(T) using which the local nonsynchronized time T of the validator 106 is mapped onto the synchronized time t of the bridge 104.

Figure 3:
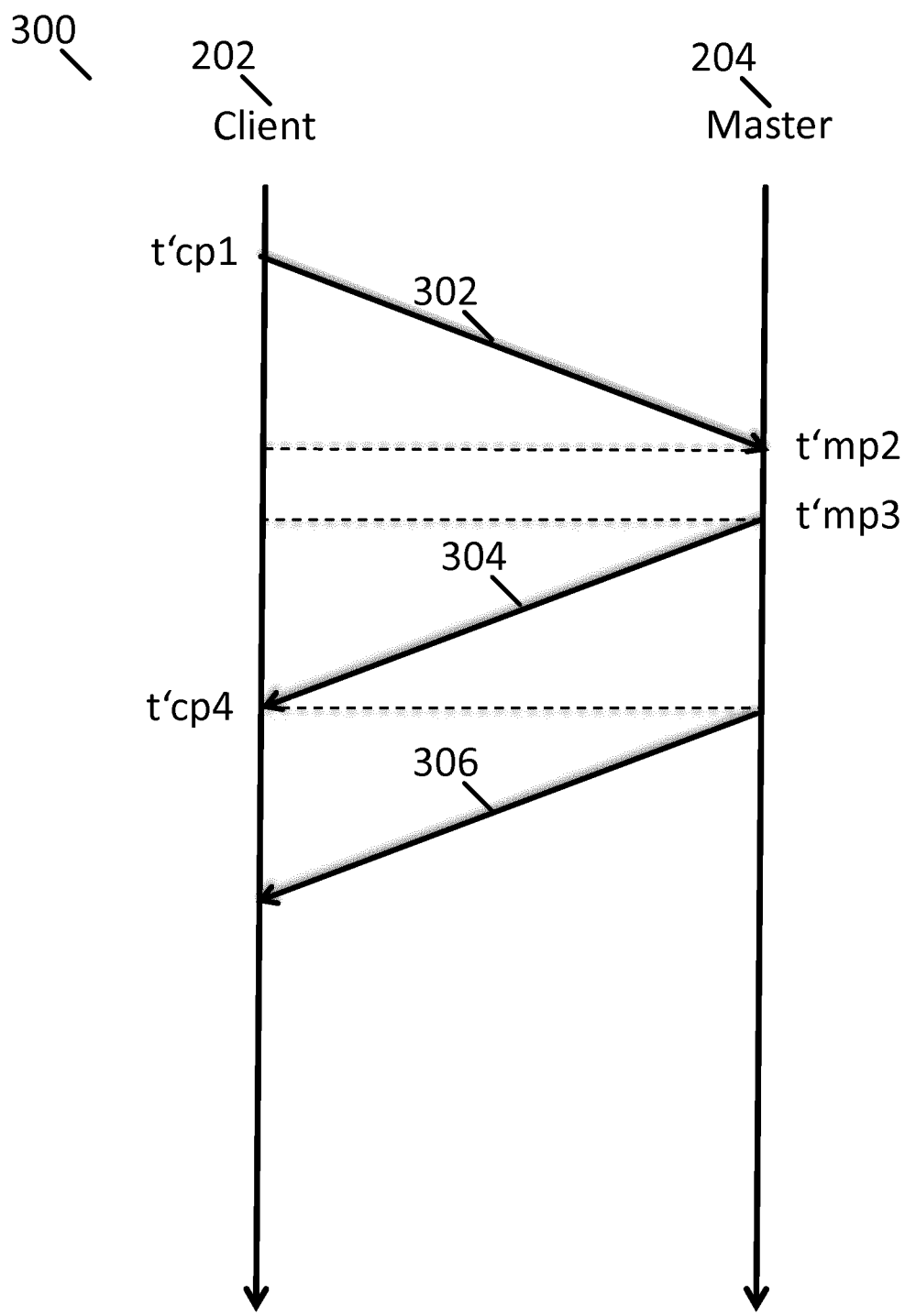
FIG. 3 schematically shows an exemplary method for determining a delay in a network.
Figure 4:
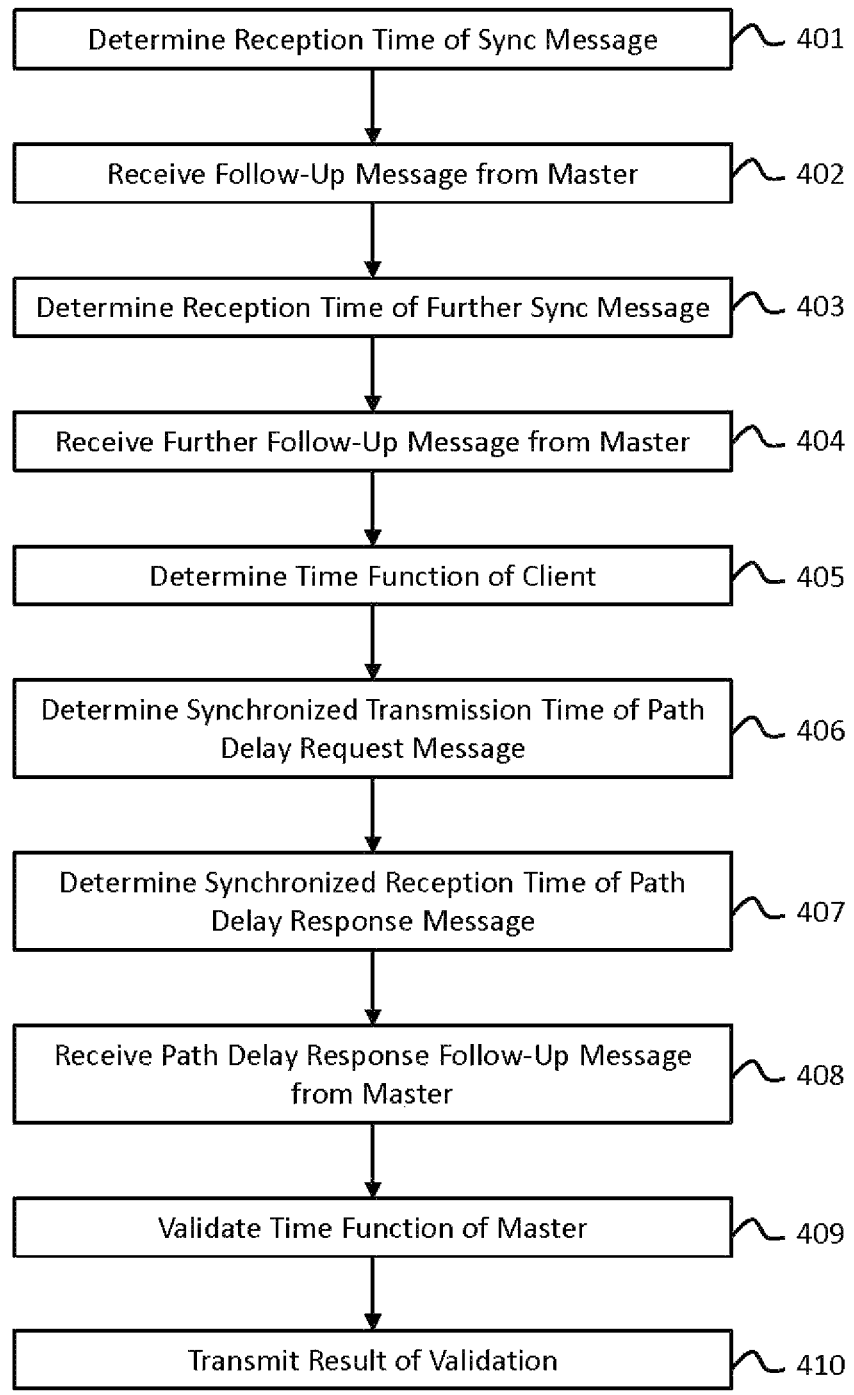
FIG. 4 illustrates a flow chart corresponding to an exemplary method for validating a time function in a network of a vehicle according to the present invention.

A flow chart corresponding to an exemplary method for validating a time function in a network of a vehicle according to the present invention is illustrated in FIG. 4, with further details provided below in the descriptions of FIGS. 2 and 3. A reception time of a synchronization message received by the client from the master is determined in step 401. A follow-up message is received by the client from the master in step 402. In step 403, the client receives a further synchronization message from the master and determines the reception time of the further synchronization message. A further follow-up message is received by the client from the master in step 404. In step 405, the client determines a time function for synchronizing the local nonsynchronized clock as further described below in reference to FIG. 2. In step 406, a synchronized transmission time of a path delay request message (302 in FIG. 3) is determined, and a synchronized reception time of a path delay response message (304 in FIG. 3) is determined in step 407. The client receives a path delay response follow-up message (306 in FIG. 3) from the master in step 408. As further described below, the time function of the master is validated by the client in step 409 and the validation result is output to safety-relevant functions of the vehicle in step 410.

Figure 2:
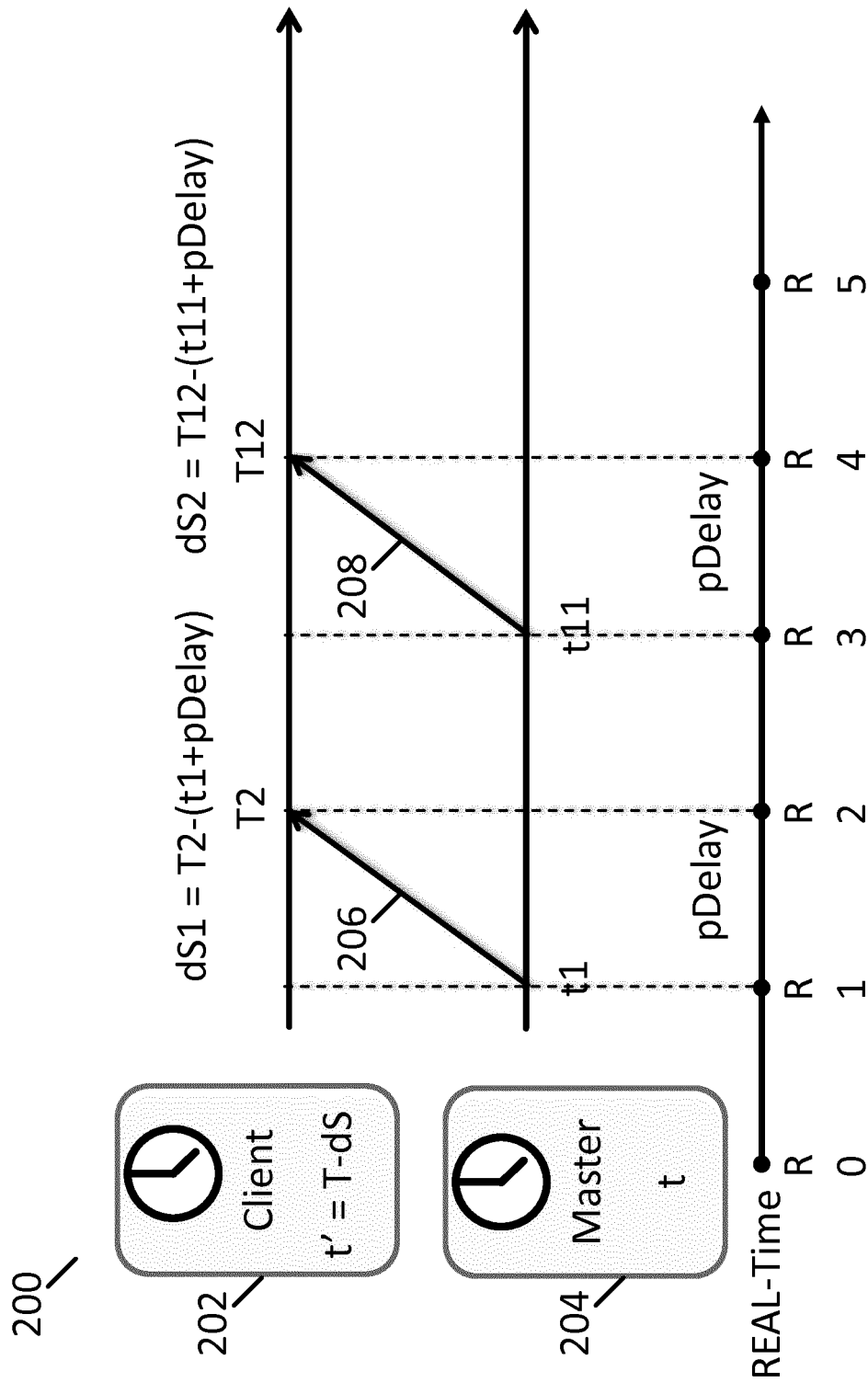
FIG. 2 schematically shows an exemplary method for calculating a time function.

FIG. 2 shows an exemplary method 200 for calculating the time function t' of a client 202 for synchronizing the local nonsynchronous time with the time of a master 204. The client 202 may be the validator 106, the bridge 104 as client and/or the client 108. The master 204 may be the grandmaster 102 and/or the bridge 104 as sub-master.

The client 202 is able to synchronize the local nonsynchronous time T with the master 204 via a first communication channel, for example via PTP. In detail, the client 202 may receive a synchronization message 206 of the master 204 and determine a reception time T2 of the synchronization message of the master. The client 202 may further receive a follow-up message of the master (not shown), wherein the follow-up message comprises a transmission time t1 of the synchronization message to the master. The client 202 is able to determine the transmission time of the synchronization message to the master 204 by way of the follow-up message. The client 202 may receive a further synchronization message 208 of the master 204 and determine a reception time T12 of the further synchronization message of the master. The client 202 may furthermore receive a further follow-up message of the master 204 (not shown), wherein the further follow-up message contains a transmission time t11 of the further synchronization message to the master 204.

The client 202 is able to determine a time function for synchronizing the local nonsynchronized clock on the basis of the reception time of the synchronization message, the reception time of the further synchronization message, the transmission time of the synchronization message included in the follow-up message and the transmission time of the further synchronization message included in the follow-up message. In detail, the client 202 is able to determine a correction value dS by which the local nonsynchronized time T has to be corrected in order to obtain the synchronized time t'. The correction value dS may be calculated as follows: dS=T2−(t1+pDelay), wherein pDelay is a delay that occurs during the transmission of the message via the first communication channel. The time function of the client 202 t'(T) may be determined as follows: t'(T)=T−dS. Using the calculated rate and the determined time function, the client 202 is able to predict a transmission time of a received synchronization message of the master 204. By receiving the associated follow-up message of the master, which the transmission time of the master 204, the client 202 is able to check whether the time, predicted by way of the time function, of the client 202 is synchronous with the actual time of the master 204. If the predicted transmission time of the client 202 corresponds to the actual transmission time of the master 204, the times of the client 202 and of the master 204 are synchronous. Furthermore, it is possible to calculate a rate deviation dm that describes a path difference between the nonsynchronized time T of the client 202 and the synchronized time of the master 204: dm=(T12−T2)/(t11−t1). This may be used in order to better determine the predicted time of the client 202.

For the determination of the time function, the client 202 is able to determine a delay pDelay between the client 202 and the master 204. As shown in FIG. 1, the delay pDelay may be determined 112 between the validator 106 as client and the bridge 104 as master, the client 108 and the bridge 104 as master, and the bridge 104 as client and the grandmaster 102 as master. The delay pDelay is preferably determined via the first communication channel.

FIG. 3 shows an exemplary method 300 for determining the delay of a path delay, pDelay for short, in the network between the client 202 and the master 204. The client 202 may be the client 108, the validator 106 and/or the bridge 104 as client. The master 204 may be the bridge 104 as master and/or the grandmaster 102. The client 202 is able to create a path delay request message 302 and transmit it to the master 204, by way of which it is possible to initiate determination of the delay. The client 202 may furthermore determine a synchronized transmission time t'cp1 of the path delay request message 302 to the master 204. To determine the synchronized transmission time, the client 202 may first of all determine a transmission time using the local nonsynchronized time and execute the time function of the client 202 at the determined transmission time in order to obtain the synchronized transmission time.

The master 204 may receive the path delay request message 302 of the client 202 and determine a synchronized reception time t'mp2. To this end, the master 204 may first of all determine a reception time using a local nonsynchronized time and then execute a time function of the master 204 at the determined reception time in order to obtain the synchronized reception time. The master 204 may generate a path delay response message 304 and transmit it to the client 204. For the path delay response message 304, the master 204 may determine a synchronized transmission time t'mp3. In the same way as for the determination of the synchronized reception time, the master 204 may determine the synchronized transmission time t'mp3. The client 202 may receive the path delay response message 304 and determine a synchronized reception time t'cp4. The synchronized reception time t'cp4 may be determined by the client 202 by determining a reception time using the local nonsynchronized time and then executing the time function of the client 202 at the determined reception time.

The master 204 may furthermore generate a path delay response follow-up message 306 and transmit it to the client 202. The path delay response follow-up message 306 contains the synchronized reception time t'mp2 and the synchronized transmission time t'mp3 of the master 204. The client 202 may receive the path delay response follow-up message. Upon reception of the path delay response follow-up message of the master 204, the client 202 has determined the synchronized times t'cp1, t'mp2, t'mp3 and t'cp4. The delay pDelay may be determined from a difference between the synchronized reception time t'mp2 and the synchronized transmission time t'cp1 and from a difference between the synchronized reception time t'cp4 and the synchronized transmission time t'mp3. The client may furthermore determine a maximum delay pDmax on the basis of the synchronized times t'cp1, t'mp2, t'mp3 and t'cp4. As an alternative, the maximum delay pDmax of the network may be fixedly predefined, for example, by a configuration parameter of the network.

By way of the synchronized times t'cp1, t'mp2, t'mp3 and t'cp4, the client 202 is able to validate a time function of the master 204. As shown in FIG. 1, for example, the validator 106 as client 202 is able to validate the time function of the bridge 104 as master 204 by way of the synchronized times t'cp1, t'mp2, t'mp3 and t'cp4. For the validation of the time function of the master 204 by the client 202, the following holds true:

$$t'cp1 + pD\max \approx t'mp2 \text{ and} \qquad 1)$$

$$t'mp3 + pD\max \approx t'cp4, \qquad 2)$$

wherein pDmax is the maximum delay between the client 202 and the master 204. The maximum delay pDmax of the network of the vehicle is preferably shorter than 100 ns due to the limited length of the lines in the vehicle. During determination of the synchronized times, relatively small deviations may occur that prevent an exact comparison of the synchronized times. In order to take these deviations into consideration, it is possible to define a predefined interval that stipulates the extent of a permitted deviation of the synchronized times between the client and the master. This enables an approximate comparison of the synchronized times of the client 202 with the synchronized times of the master 204. If conditions 1) and 2) are met, the time function of the master 204 may be assumed to be correct.

If the master 204 is, for example, a bridge 104 having a plurality of clients 202, for example, client 108 and validator 106, it is assumed that the bridge 104 as master 204 applies the validated time function for all clients 202 of the bridge 104. A validation of the time function of the bridge 104 by a client 202, for example, validator 106, is thus sufficient to validate the time function of the bridge 104 as master 204 for all clients 202 of the bridge 104.

The validator 106 as client 202 may additionally receive 114 validation request messages from clients 202, for example, client 108 and/or bridge 104 as client 202. The validation request messages may be received by the validator 106 via a second communication channel. The second communication channel is different from the first communication channel. By way of example, the second communication channel may use SOME/IP to transmit the validation request message. Using the second communication channel enables out-of-band transmission of the validation request messages. The validation request messages may furthermore be transmitted via the second communication channel without time being critical. A validation request message of a client 202, for example, client 108 or bridge 104 as client, to the validator 106 may comprise a synchronized transmission time of a path delay request message, a synchronized reception time of a path delay response message, a synchronized reception time of a path delay request message, and a synchronized transmission time of a path delay response message between a client 202 and a master 204.

A predefined network topology is furthermore stored on the validator 106. The network topology preferably has a tree structure, starting from the grandmaster 102 as root element of the topology. The validator 106 is able to determine a maximum delay between a client 202, from which the validation request message was received, and an associated master 204 of the network on the basis of a predefined network topology. On the basis of the synchronized transmission time of the path delay request message, of the synchronized reception time of the path delay response message, of the synchronized reception time of the path delay request message, of the synchronized transmission time of the path delay response message, and of the determined maximum delay, the validator 106 is able to validate the time function of the master 204 of the requesting client 202, as described above.

Through iterative validation of the time functions of the master 204 by the validator 106, the validator 106 is able to safely establish, within the meaning of ISO 26262, that all clients 202 of the network have synchronized to the same time. The time synchronization is therefore able to be safely validated without the client 108, the bridge 104 and the grandmaster 102 having to bear a safety load. The safety load is borne only by the validator 106.

The validator 106 may furthermore receive a further validation request message 114 of a client 202, for example, client 108 or bridge 104 as client, via the second communication channel. The further validation message may comprise a predicted reception time of a synchronization message and a synchronized transmission time of a synchronization message from a follow-up message between a client 202 and a master 204. The validator 106 may validate the time function of a client 202 by the validator 106 determining whether the predicted reception time of the synchronization message of the client 202 plus a predefined maximum delay between the client 202 and the master 204 gives a value that lies within a predefined interval range around the synchronized transmission time of the synchronization message of the master associated with the client. If the value lies within the predefined interval range, the validator 106 is able to determine the time function of the client 202 as valid. If the value does not lie within the predefined interval range, the validator 106 is able to determine the time function of the client 202 as not valid. The validator 106 may preferably transmit the result of the validation of the time function of the client 202 to one or more safety-relevant functions. By virtue of the further validation request message, the validator 106 is able to iteratively validate time functions of clients 202 of the network in an efficient manner until all time functions of clients 202 of the network have been validated.

LIST OF REFERENCE SIGNS 100 system
102 grandmaster
104 bridge
106 validator
108 client
110 synchronization of the time via a first communication channel
112 determination of a delay via a first communication channel
114 transmission or reception of validation request messages via a second communication channel
200 method
202 client
204 master
206 synchronization message
208 synchronization message
300 method
302 path delay request message
304 path delay response message
306 path delay response follow-up message The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for validating a time function in a network of a vehicle, the method comprising:
   determining a reception time of a synchronization message of a master for synchronization of an item of time information by a first client, wherein the first client is connected to the master via a first communication channel;
   receiving a follow-up message of the master via the first communication channel by the first client, wherein the follow-up message comprises a transmission time of the synchronization message;
   determining a reception time of a further synchronization message of the master by the first client;
   receiving a further follow-up message of the master via the first communication channel by the first client, wherein the further follow-up message comprises a transmission time of the further synchronization message;
   determining, by the first client, a time function of the first client based on the reception time of the synchronization message, the reception time of the further synchronization message, the transmission time of the synchronization message included in the follow-up message, and the transmission time of the further synchronization message included in the further follow-up message;

determining, by the first client, a synchronized transmission time of a path delay request message from the first client to the master by way of the time function of the first client;

determining, by the first client, a synchronized reception time of a path delay response message from the master by way of the time function of the first client;

receiving a path delay response follow-up message from the master by the first client, wherein the path delay response follow-up message comprises a synchronized reception time of the path delay request message and a synchronized transmission time of the path delay response message;

validating, by the first client, a time function of the master based on the synchronized transmission time of the path delay request message to the master, the synchronized reception time of the path delay response message to the first client, the synchronized reception time of the path delay request message to the master, the synchronized transmission time of the path delay response message to the first client, and a predefined maximum delay between the first client and the master;

wherein the predefined maximum delay comprises a delay in communication between the master and the first client and between the first client and the master;

predicting a synchronized reception time of the synchronization message from the master by the first client using the time function of the first client;

validating the time function of the first client, including:
in a case in which the synchronized reception time of the synchronization message from the master plus the specified maximum delay between the first client and the master is a value that is within a specified interval range around the transmission time of the synchronization message included in the follow-up message, determining that the time function of the first client is valid; and
in a case in which the value is not within the specified interval range, determining that the time function of the first client is invalid; and updating the time function of the first client based on the reception time of the synchronization message, the reception time of the further synchronization message, the transmission time of the synchronization message included in the follow-up messagex, and the transmission time of the synchronization message included in the further follow-up message.

2. The method according to claim 1, further comprising:
receiving a validation request message of a second client via a second communication channel by the first client,
wherein the validation request message comprises the following time information between the second client and a master associated with the second client:
a second synchronized transmission time of a second path delay request message;
a second synchronized reception time of a second path delay response message;
a second synchronized reception time of a second path delay request message; and
a second synchronized transmission time of a second path delay response message;
determining a second maximum delay between the second client and the master associated with the second client based on a predefined network topology by the first client; and
validating a time function of the master associated with the second client based on the second synchronized transmission time of the path delay request message, the second synchronized reception time of the path delay response message, the second synchronized reception time of the path delay request message, the second synchronized transmission time of the path delay response message, and the determined second maximum delay.

3. The method according to claim 2, further comprising:
receiving a further validation request message of the second client via the second communication channel, wherein the further validation request message comprises time information between the second client and a second master associated with the second client including:
a predicted reception time of a synchronization message between the second client and the second master associated with the second client; and
a synchronized transmission time of the synchronization message between the second client and the second master associated with the second client;
validating the time function of the second client by the first client, wherein the validation of the time function of the second client comprises:
determining whether the predicted reception time of the synchronization message of the second client plus a predefined maximum delay between the second client and the second master associated with the second client gives a value that lies within a predefined interval range around the synchronized transmission time of the synchronization message of the second master associated with the second client; and
in a case in which the value lies within the predefined interval range:
determining the time function of the second client as valid;
in a case in which the value does not lie within the predefined interval range:
determining the time function of the second client as not valid; and
transmitting a result of the validation of the time function of the second client to one or more safety-relevant functions by the first client.

4. The method according to claim 1, wherein validating of the time function of the master comprises:
determining whether the synchronized transmission time of the path delay request message plus the predefined maximum delay gives a first value that lies within a predefined interval range around the synchronized reception time of the path delay request message;
determining whether the synchronized transmission time of the path delay response message plus the predefined maximum delay gives a second value that lies within the predefined interval range around the synchronized reception time of the path delay response message; and
in a case in which the first value and the second value lie within the respective interval ranges:
determining the time function of the master as valid; and
in a case in which the first value and/or the second value do not lie within the respective interval ranges:
determining the time function of the master as not valid.

5. The method according to claim 2, wherein the network is an Ethernet network;
wherein the second client is a client or a bridge; and
wherein the master is a grandmaster or a sub-master.

6. A non-transitory computer-readable medium for validating a time function of a master in a network of a vehicle, wherein the non-transitory computer-readable medium comprises instructions which, when executed on a computer, execute a method comprising:
   determining a reception time of a synchronization message of a master for synchronization of an item of time information by a first client, wherein the first client is connected to the master via a first communication channel;
   receiving a follow-up message of the master via the first communication channel by the first client, wherein the follow-up message comprises a transmission time of the synchronization message;
   determining a reception time of a further synchronization message of the master by the first client;
   receiving a further follow-up message of the master via the first communication channel by the first client, wherein the further follow-up message comprises a transmission time of the further synchronization message;
   determining a time function of the first client based on the reception time of the synchronization message, the reception time of the further synchronization message, the transmission time of the synchronization message included in the follow-up message, and the transmission time of the synchronization message included in the further follow-up message;
   determining a synchronized transmission time of a path delay request message from the first client to the master by way of the time function of the first client;
   determining a synchronized reception time of a path delay response message from the master by way of the time function of the first client;
   receiving a path delay response follow-up message from the master by the first client, wherein the path delay response follow-up message comprises a synchronized reception time of the path delay request message and a synchronized transmission time of the path delay response message;
   validating a time function of the master based on the synchronized transmission time of the path delay request message to the master, the synchronized reception time of the path delay response message to the first client, the synchronized reception time of the path delay request message to the master, the synchronized transmission time of the path delay response message to the first client, and a predefined maximum delay between the first client and the master;
   wherein the predefined maximum delay comprises a delay in communication between the master and the first client and between the first client and the master;
   predicting a synchronized reception time of the synchronization message from the master by the first client using the time function of the first client;
   validating the time function of the first client, including:
      in a case in which the synchronized reception time of the synchronization message from the master plus the specified maximum delay between the first client and the master is a value that is within a specified interval range around the transmission time of the synchronization message included in the follow-up message, determining that the time function of the first client is valid; and
      in a case in which the value is not within the specified interval range, determining that the time function of the first client is invalid; and
   updating the time function of the first client based on the reception time of the synchronization message, the reception time of the further synchronization message, the transmission time of the synchronization message included in the follow-up messagex, and the transmission time of the synchronization message included in the further follow-up message.

7. A system for validating a time function of a master in a network of a vehicle, the system comprising:
   a master;
   a bridge;
   a validator; and
   a first client;
   wherein the first client is programmed to:
   determine a reception time of a synchronization message of the master for synchronization of an item of time information, wherein the first client is connected to the master via a first communication channel;
   receive a follow-up message of the master via the first communication channel, wherein the follow-up message comprises a transmission time of the synchronization message;
   determine a reception time of a further synchronization message of the master; and
   receive a further follow-up message of the master via the first communication channel, wherein the further follow-up message comprises a transmission time of the further synchronization message;
   wherein the validator is programmed to determine a time function of the first client based on the reception time of the synchronization message, the reception time of the further synchronization message, the transmission time of the synchronization message included in the follow-up message, and the transmission time of the synchronization message included in the further follow-up message;
   wherein the first client is programmed to determine a synchronized transmission time of a path delay request message from the first client to the master by way of the time function of the first client;
   wherein the master is programmed to determine a synchronized reception time of a path delay response message from the master by way of the time function of the first client;
   wherein the first client is programmed to receive a path delay response follow-up message from the master, wherein the path delay response follow-up message comprises a synchronized reception time of the path delay request message and a synchronized transmission time of the path delay response message; and
   wherein the validator is programmed to validate a time function of the master based on the synchronized transmission time of the path delay request message to the master, the synchronized reception time of the path delay response message to the first client, the synchronized reception time of the path delay request message to the master, the synchronized transmission time of the path delay response message to the first client, and a predefined maximum delay between the first client and the master;
   wherein the predefined maximum delay comprises a delay in communication between the master and the first client and between the first client and the master;
   wherein the first client is programmed to predict a synchronized reception time of the synchronization message from the master using the time function of the first client;
   wherein the validator is programmed to validate the time function of the first client, including:

in a case in which the synchronized reception time of the synchronization message from the master plus the specified maximum delay between the first client and the master is a value that is within a specified interval range around the transmission time of the synchronization message included in the follow-up message, determine that the time function of the first client is valid; and in a case in which the value is not within the specified interval range, determine that the time function of the first client is invalid; and wherein the validator is programmed to update the time function of the first client based on the reception time of the synchronization message, the reception time of the further synchronization message, the transmission time of the synchronization message included in the follow-up messagex, and the transmission time of the synchronization message included in the further follow-up message.

8. A vehicle comprising a system for validating a time function of a master in a network of a vehicle according to claim 7.

9. The method according to claim 2, further comprising:
transmitting a result of the validation of at least one of the time function of the master and the master associated with the second client to one or more safety-relevant functions by the first client; and
executing the one or more safety-relevant functions using the result of the validation of the time function.

10. The method according to claim 2, further comprising:
predicting a synchronized reception time of the synchronization message of the master by the first client using the time function of the first client;
validating the time function of the first client, wherein the validation of the time function of the first client comprises:
determining whether the predicted synchronized reception time of the synchronization message plus the predefined maximum delay between the first client and the master gives a value that lies within a predefined interval range around the transmission time, contained in the follow-up message, of the master; and
in a case in which the value lies within the predefined interval range:
determining the time function of the first client as valid;
in a case in which the value does not lie within the predefined interval range:
determining the time function of the first client as not valid; and
updating the time function of the first client based on the reception time of the synchronization message, the reception time of the further synchronization message, the transmission time of the synchronization message included in the follow-up message, and the transmission time of the synchronization message included in the further follow-up message.

11. The method according to claim 2, wherein the validation of the synchronized times comprises:
determining whether the synchronized transmission time of the path delay request message plus the predefined maximum delay gives a first value that lies within a predefined interval range around the synchronized reception time of the path delay request message;
determining whether the synchronized transmission time of the path delay response message plus the predefined maximum delay gives a second value that lies within the predefined interval range around the synchronized reception time of the path delay response message; and
in a case in which the first value and the second value lie within the respective interval ranges:
determining the time function of the master as valid; and
in a case in which the first value and/or the second value do not lie within the respective interval ranges:
determining the time function of the master as not valid.

12. The method according to claim 3, wherein the validation of the synchronized times comprises:
determining whether the synchronized transmission time of the path delay request message plus the predefined maximum delay gives a first value that lies within a predefined interval range around the synchronized reception time of the path delay request message;
determining whether the synchronized transmission time of the path delay response message plus the predefined maximum delay gives a second value that lies within the predefined interval range around the synchronized reception time of the path delay response message; and
in a case in which the first value and the second value lie within the respective interval ranges:
determining the time function of the master as valid; and
in a case in which the first value and/or the second value do not lie within the respective interval ranges:
determining the time function of the master as not valid.

13. The method according to claim 3, wherein the network is an Ethernet network;
wherein the second client is a client or a bridge; and
wherein the master is a grandmaster or a sub-master.

* * * * *